United States Patent [19]

Rea

[11] 4,436,463
[45] Mar. 13, 1984

[54] QUICK CHANGE TOOLING SYSTEM

[75] Inventor: Ike D. Rea, Mount Clemens, Mich.

[73] Assignee: General Electric Company, Detroit, Mich.

[21] Appl. No.: 303,080

[22] Filed: Sep. 17, 1981

[51] Int. Cl.³ .................... B23Q 3/12; B23B 31/02
[52] U.S. Cl. .................................. 409/232; 279/1 A; 279/82; 408/239 A; 409/234
[58] Field of Search ............... 409/232, 234; 408/239 R, 239 A; 279/1 A, 82, 1 B

[56] References Cited

U.S. PATENT DOCUMENTS

| | | |
|---|---|---|
| 2,361,324 | 10/1944 | Severson ........................ 409/232 |
| 2,719,722 | 10/1955 | Nickless ........................ 279/91 |
| 2,816,770 | 12/1957 | De Vlieg et al. ................ 279/1 A |
| 3,353,834 | 11/1967 | Bay ................................ 279/82 |
| 3,405,950 | 10/1968 | Cox ................................ 279/103 |
| 3,564,969 | 2/1971 | Kimmelaar ...................... 409/232 |
| 3,577,809 | 5/1971 | Brandl et al. ................... 409/232 X |
| 3,596,917 | 8/1971 | Meyer ............................. 279/89 |
| 3,678,801 | 7/1972 | Hague ............................. 409/232 |
| 3,679,220 | 7/1972 | Reeves ............................. 279/1 B |
| 3,680,435 | 8/1972 | DePlante ......................... 279/1 A X |
| 3,735,993 | 5/1973 | Selbert ............................ 279/1 B |
| 3,806,272 | 4/1974 | Muller ............................ 409/232 |
| 3,851,890 | 12/1974 | Smith ............................. 279/82 |
| 3,884,120 | 5/1975 | DiFerdinando ................. 279/1 A X |
| 4,238,167 | 12/1980 | Brugger et al. ................ 409/232 |
| 4,298,208 | 11/1981 | Benjamin et al. .............. 409/234 |
| 4,328,975 | 5/1982 | Heguy ........................... 409/234 |

FOREIGN PATENT DOCUMENTS 960027 12/1974 Canada ............................ 409/234
1170754 5/1964 Fed. Rep. of Germany ..... 279/1 A
1627079 2/1970 Fed. Rep. of Germany ...... 409/234

Primary Examiner—William R. Briggs
Attorney, Agent, or Firm—Hedman, Gibson, Costigan & Hoare

[57] ABSTRACT

The subject invention relates to an assembly for facilitating the mounting and ejection of a rotatable cutting tool adaptor on a machine tool. More particularly, the subject invention allows a cutting tool adaptor to be manually interlocked with a rotatable spindle permitting standard cutting tools to be rapidly mounted on a machine tool. The assembly includes an elongated tapered tool adaptor shank, with one end thereof being defined by a flange having a V-shaped channel formed circumferentially therearound. The flange includes a pair of opposed slots interrupting the flange and in communication with the channel. A rotatable cylindrical spindle is configured to receive the tapered end of the adaptor shank. A cylindrical nut is provided for interconnecting the adaptor shank to the spindle. The inner surface of the nut includes a threaded portion which engages a threaded portion provided on the outer surface of the spindle. In addition, the nut includes two opposed projections extending radially inwardly. When the nut is mounted over the shank and spindle, the projections are initially received in the slots of the flange. When the nut is tightened, the projections become engaged in the channel of the flange. The tightening of the nut functions to pull the tool adaptor shank securely into the spindle of the machine tool. Upon loosening of the nut, tool adaptor is positively ejected from the machine tool spindle.

10 Claims, 8 Drawing Figures

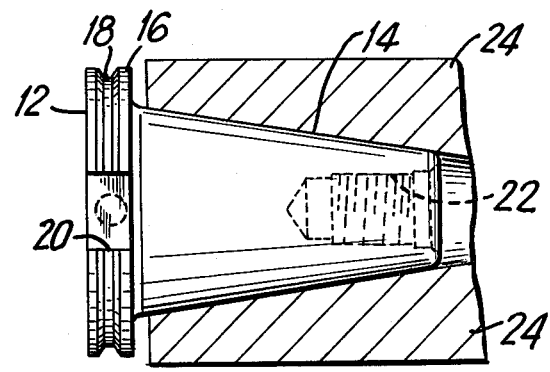
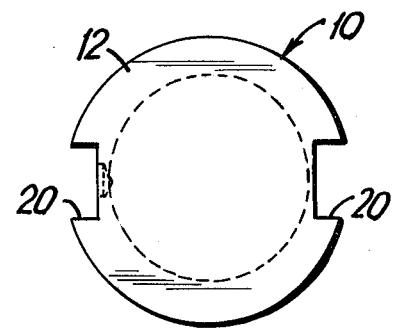
FIG.1  FIG.2
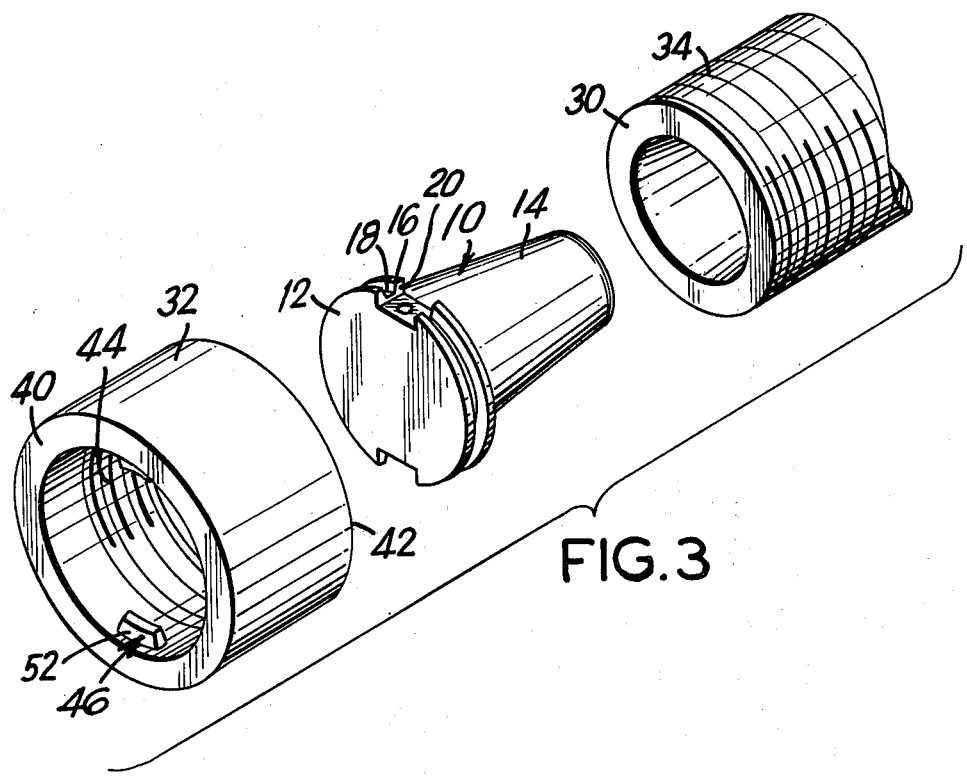
FIG.3

QUICK CHANGE TOOLING SYSTEM

BACKGROUND OF THE INVENTION

The subject invention relates to an assembly for facilitating the mounting and ejection of a rotatable cutting tool adaptor on a machine tool. More particularly, the subject invention permits a tool adapter shank to be manually secured to a rotatable spindle in a manner permitting the use of tool adaptors suited for automatic or numerically controlled machines in conjunction with conventional (manually controlled) machines. The subject invention also enables the positive ejection of the tool adaptor shank from the machine tool spindle.

In many manufacturing methods, various high speed milling and grooving tools are used to machine metal articles into particular configurations. Accordingly, in an assembly plant, a number of work stations are provided having equipment capable of driving cutting tools. One type of tooling apparatus includes a rotatable spindle which is connectable to various cutting tools and/or cutting tool adaptors designed to perform various machining operations.

Many methods are utilized to increase the productivity of machining operations. One approach used in the prior art is to design tooling systems which may be rapidly and automatically mounted on spindles. By this arrangement, new tools with fresh cutting blades may be rapidly substituted for worn tools. Alternatively, it may be desirable to substitute a different type of tool capable of performing another function.

One of the prior art "quick change" tooling systems includes a tool adaptor shank which is readily mounted to the rotatable spindle of a driver. The latter prior art tool shank is provided with a retention stud that can be gripped by a power actuated collet arrangement for automatically drawing the shank into the spindle and holding it firmly during a cutting operation. The latter tool adaptor shank has a longitudinally extending, tapered configuration, and includes a gripping end defined by a cylindrical flange. The flange of the shank includes a V-shaped channel which extends circumferentially therearound. In addition, a pair of opposed slots are provided that interrupt the flange, and are in communication with the V-shaped channel. By this arrangement, a tool shank may be automatically mounted on a machine tool spindle having one or two axially projecting prongs which are received by the slots in the flange. In use, both the spindle and tool shank are rotated by the driver causing the cutting tool to be rotated. When the cutting tool is to be changed, automatic equipment is provided to rapidly eject the cutting tool and adaptor from the machine spindle and substitute an alternate tool.

Many manufacturers have adopted quick change tooling systems because of their convenience and high speed operation. As can be appreciated, a specially designed set of cutting tool adaptors must be purchased which are compatible with the quick change tool system utilized by the particular machine tool. The prior art tool systems are effectively utilized in machining centers having automatic tool change equipment. The quick change tools may also be utilized on equipment having manually actuated power drawbars. Unfortunately, on manual machines which do not provide for power drawbars, the quick change tool systems cannot be used conveniently. If the operator desires quick change tooling for the latter type of manual machine, he must purchase an entire new set of tools. Thus, it would be desirable to provide an assembly to enable the mounting of quick change cutting tool adaptors on manual macnine equipment, and this feature is an object of the subject invention.

Accordingly, it is an object of the subject invention to provide a new and improved assembly to facilitate the mounting of rotatable shanks on machine tools.

It is a further object of the subject invention to provide a new and improved assembly which permits the rapid mounting of quick change cutting tool adaptors on a rotatable spindle utilized on manually operated machine tools.

It is another object of the subject invention to provide an assembly which is connectable to a prior art tool adaptor shank for securely locking the shank in a rotatable spindle of a machine tool thereby permitting the rapid interchange of cutting tools by manual means.

It is still a further object of the subject invention to provide an assembly which is operative to positively eject the tool adaptor shank from the tool shank.

SUMMARY OF THE INVENTION

In accordance with these and many other objects, the subject invention provides an assembly adapted for use with a prior art tool adaptor shank. The prior art tool adaptor shank has an elongated cylindrical configuration including a gripping end and a driving end. The outer surface of the shank is tapered towards the driving end. The gripping end of the tool shank is defined by a cylindrical flange having a V-shaped channel formed circumferentially therearound. The flange portion is provided with a pair of opposed slots interrupting the flange and in communication with the channel. The slots are provided for engaging prongs provided on the machine tool. The proportions of the flange and tool shank must be such that the radial distance between the minor diameter of the circumferential groove in the flange and the adjacent major diameter of the taper shank will allow the projecting prong or prongs on the spindle to be sufficiently robust to transmit a driving torque suitable for the size of the members. It should be noted that small size shanks used for relatively light cuts can be adequately driven by the friction between mating tapers. In such cases projecting prongs are not provided on the machine spindle. However for purposes of the subject invention the projecting prongs, or drive keys, are required to assure positive operation of the tool changing system.

In accordance with the subject invention, a rotatable spindle is provided having a cylindrical configuration with the outer surface thereof being threaded. The inner surface of the spindle is tapered and substantially conforms to the configuration of the driving end of the tool adaptor shank thereby enabling the driving end to be freely receivable therein. An elongated cylindrical nut is provided with the inner surface thereof being threaded and adapted to engage the threaded portion of the spindle. In addition, the inner surface of the nut includes a pair of opposed projections, adjacent the front end thereof, which extend radially inwardly. The nut is threaded on the spindle and semi-permanently located on the spindle by means of a radial stop on the spindle contacting a mating stop in the nut. As the nut is turned in a direction that would tend to remove it from the spindle, rotation is stopped by the previously mentioned mating stops. When the nut is stopped from rotating the projections in the nut are aligned with the drive keys in the spindle. The axial position of the projections in the nut is then slightly farther from the face of the spindle than the groove in the flange would be if the shank taper were seated. This mismatch is necessary for the tool adaptor to be positively ejected. The circumferential ends of the projections are heavily beveled to facilitate entry of the projections into the groove in the flange as the nut is turned to advance it along the spindle. As the nut is turned the projections enter the groove and slide circumferentially, at the same time drawing the tool shank into the spindle. The pitch of the thread, the tolerances and allowances on the projections and groove, and the initial axial position of the projections are so chosen that the external taper on the shank and the internal taper of the spindle are in full contact when the nut has rotated approximately 90°. Slight additional rotation will be possible because of the elasticity of the materials involved and is necessary to secure the tool in the spindle firmly enough for cutting to occur. In any case, the total rotation of the nut is limited to something less than 180° because the projections must not be allowed to align with the other notch in the flange.

To remove the tool, the nut is rotated so as to remove it from the spindle. The projections move axially until they contact the wall of the groove farthest from the spindle face. Continued rotation of the nut overcomes the elasticity of the members and finally forces the disengagement of the mating tapers just before the rotational stop point is reached. The projections in the nut, the drive keys on the spindle and the notches in the flange now being in line, the tool can be removed and will in fact require restraint to keep from falling out. It is desirable to provide a stop to limit draw-in rotation so that improper locking will be indicated.

The type of the projections provided in the nut may be varied. In alternative embodiments of the subject invention, cylindrical and square inserts are provided. In addition, the projection may be mounted with roller bearings or fixedly mounted with set screws. The shape of the projection should be configured so as to substantially conform to the channel in the flange in shape, size and location such that the mounted cutting tool adaptor will be positively ejected from the tool shank when the nut is loosened.

Further objects and advantages of the subject invention will become apparent from the following detailed description when taken in conjunction with the drawings in which:

BRIEF DESCRIPTION OF THE DRAWINGS

FIG. 1 is a side elevational view, partially in section, of a quick change tool adaptor shank positioned in a spindle.

FIG. 2 is a front elevational view of the quick change tool adaptor shank.

FIG. 3 is an exploded perspective view of the new and improved assembly of the subject invention including a tool adaptor shank, spindle and nut.

DESCRIPTION OF THE PREFERRED EMBODIMENTS

Figure 4:
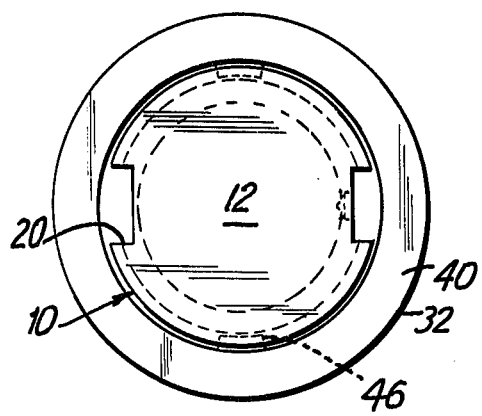
FIG. 4 is a front elevational view, similar to FIG. 2, illustrating the new and improved assembly of the subject invention.

Referring to FIGS. 1 and 2, there is illustrated a tool adaptor shank 10 which is utilized with the prior art quick change tooling systems. The tool adaptor shank 10 is generally elongated in configuration having a forward gripping end 12 and a rear driving end 14. The outer surface of the tool shank 10 is tapered inwardly towards the rear driving end 14. The forward gripping end is defined by a generally cylindrical flange portion 16 having a channel 18 formed therein and extending circumferentially therearound. As shown in FIGS. 1 and 2, channel 18 is generally V-shaped in configuration, however, other cross-sectional configurations may be employed. Tool shank 10 further includes a pair of slots 20 which interrupt the flange 16 and communicate with the channel 18. The opposed slots 20 are generally square in configuration and are adapted to receive driving prongs. The machine tool spindle (not shown) may include axially projecting prongs which readily fit into the slots 20 enabling the tool to be rotatably driven. The rear of the tool adaptor shank 10 includes a threaded aperture 22 adapted to accommodate a retention stud (not shown). When used on automatic equipment, the retention stud is gripped by a power actuated collet arrangement capable of drawing the tool adaptor shank 10 into spindle 24 such that it is securely locked therein during the cutting operation. In use, the spindle 24 is rotated, thereby rotating both the tool adaptor shank 10 along with the cutting tool.

As discussed above, the quick change tool systems are very effective in installations where machinery is provided having automatic tool change capability. The tools can also be utilized on equipment having manually actuated power draw bars for grasping the retention stud. However, where manual machinery is not provided with power draw bars, there is no convenient way to draw in and lock the tool adaptor shank 10 to the rotatable spindle 24. Accordingly, it is an object of the subject invention to provide such a secure locking means to enable the tool adaptor shank to be used on manual equipment.

Figure 5:
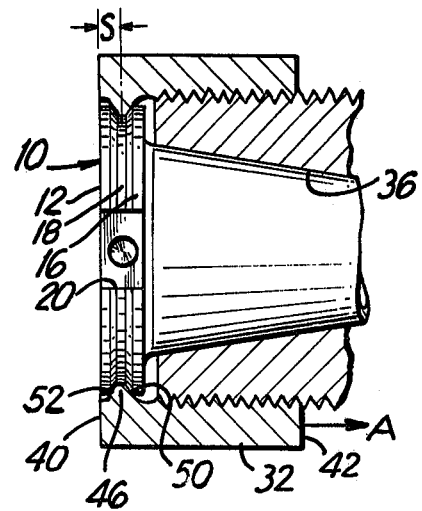
FIG. 5 is a side elevational view, partially in section, illustrating the new and improved assembly of the subject invention.

Referring now to FIGS. 3–5, the assembly for mounting the tool adaptor shank of the subject invention is more particularly illustrated. The assembly comprises the tool adaptor shank 10 along with a threaded spindle 30 and a nut 32. Spindle 30 is connected to the machine tool (not shown). Spindle 30 may be rotatable in certain applications, whereas when used as part of a lathe, it would be non-rotatable. The outer surface 34 of spindle 30 is threaded. As illustrated in FIG. 5, the inner surface 36 of spindle 30 is tapered in configuration and substantially conforms to the tapered configuration of the driving end 14 of the tool adaptor shank 10. Accordingly, the driving end 14 of the tool adaptor shank 10 is freely receivable within the spindle 30.

The subject invention further includes a nut 32 having opposed front and rear ends 40 and 42, respectively. The inner surface 44 of nut 32 is threaded adjacent the rear end 42 thereof. The threading 44 is adapted to engage with the threads 34 provided on the outer surface of the spindle 30. In accordance with the subject invention, nut 32 further includes a pair of opposed projections 46 which are formed on the inner surface thereof adjacent the front end 40 of the nut 32. Projections 46 extend radially inwardly, an amount substantially corresponding to the depth of the channel 18 formed in the flange 16 of the tool shank. Preferably, the opposed sides 50 and 52 of each projection are chamfered and compliment the configuration of the V-shaped groove.

The nut 32 is threaded on the spindle 30 and semi-permanently located on the spindle by means of a radial stop (not shown) on the spindle 30 contacting a mating stop (not shown) in the nut 32. As the latter is turned in a direction that would tend to remove it from the spindle, rotation is stopped by the mating stops. When the nut 32 is stopped from rotating, the projections 46 in the nut are aligned with the drive keys in the spindle. The axial position of the projections 46 in the nut is then slightly farther from the face of the spindle than the channel or groove 18 formed in the flange portion 16 would be if the tapered shank 10 were seated. This mismatch is necessary for the tool to be positively ejected. The circumferential ends of the projections 46 are heavily beveled to facilitate entry of the projections into the groove 18 in the flange portion 16 when the nut 32 is turned to advance it along the spindle 24. As the nut is turned the projections 46 enter the groove 18 and slide circumferentially, at the same time drawing the tool adaptor 10 shank into the spindle. The pitch of the thread, the tolerances and allowances on the projections and groove, and the initial axial position of the projections 46 are so chosen that the external taper 14 on the shank and the internal taper of the spindle are in full contact when the nut 32 has rotated approximately 90°. Slight additional rotation of the nut will be possible because of the elasticity of the materials involved and is necessary to secure the tool in the spindle firmly enough for cutting to occur. In any case, the total rotation of the nut 32 is limited to something less than 180° because the projections 46 must not be allowed to align with the other slot 20 in the flange 16. To remove the tool, the nut 32 is rotated so as to remove it from the spindle. The projections 46 move axially until they contact the wall of the channel 18 farthest from the spindle face. Continued rotation of the nut 32 overcomes the elasticity of the members and finally forces the disengagement of the mating tapers just before the rotational stop point is reached. The projections 46 in the nut, the drive keys on the spindle and the notches in the flange now being in line, the tool can be removed.

The tool adaptor shank 10 may be connected to a machine tool in a manner similar to the prior art quick change mounting. More particularly, and as illustrated in FIG. 4, slots 20 are left unobstructed and are capable of receiving the prongs of a machine tool spindle. Furthermore, the front end 40 of nut 32 does not project axially beyond the front surface of shank 10. Preferably, and as illustrated in FIG. 5, the spacing S between the projections 46 and the front end 40 of the nut corresponds to the spacing between the center of the channel 18 and the front surface of the shank 10. By this arrangement, the front end 40 of the nut is disposed coplanar with the front surface of the tool shank such that the mounting of the cutting tools is not inhibited.

Figure 6:
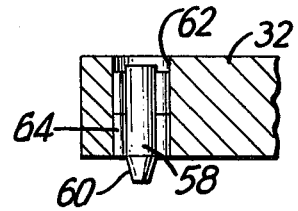
FIGS. 6 through 8 are partial cross sectional views illustrating alternate embodiments of the projections, which can be provided on the nut of the subject invention.
Figure 7:
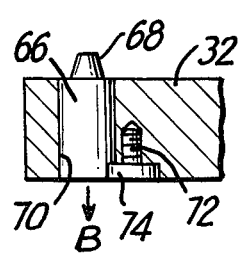
Figure 8:
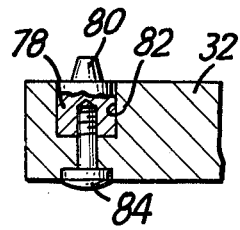

FIGS. 6-8 illustrate alternate embodiments of the projections 46 which may be utilized with the subject invention. In the alternate embodiments, the projections are defined by discrete pins which are mounted in apertures formed in the nut 32. Referring specifically to FIG. 6, each projection is defined by a longitudinally extending cylindrical pin 58 having an inwardly directed tapered conical tip 60 adapted to engage the channel 18 of the shank 10. The cylindrical pin 58 is mounted in a cylindrical aperture 62 formed in the nut 32. In this embodiment of the subject invention, a plurality of roller bearings 64 are interposed between the pin 58 and the walls of the aperture 62.

In FIG. 7, another embodiment of the projection of the subject invention is illustrated, and includes a cylindrical pin 66 having a tapered conical portion 68 adapted to engage the channel of the shank. Pin 66 is mounted in an aperture 70 provided in the nut 32. In this embodiment, a cap screw 72 is threadably engaged with the outer surface of the nut. The cap screw 72 is located such that the head portion 74 thereof is braced against the radially outer end of the pin 66. By this arrangement, the head portion 74 acts to prevent the pin 66 from moving axially out of the aperture 70 in a direction indicated by arrow B.

In FIG. 8 there is illustrated a third embodiment wherein the projection is defined by a generally square base portion 78 having a conical projection 80 extending radially inwardly therefrom. The base portion 78 is fixedly mounted in an aperture 82 provided in the nut and having a complementary square configuration. A screw 84 extends into and is threadably engaged with the base 78 of the projection, thereby inhibiting the movement projection of any direction.

The above mentioned patents and/or publications are incorporated herein by reference. Obviously, other modifications and variations of the present invention are possible, in light of the above teachings. It is therefore, to be understood that changes may be made in the particular embodiments of the invention described which are within the full intended scope of the invention as defined by the appended claims.

I claim:

1. An assembly for facilitating the mounting and ejecting of cutting tools on a rotatable tool adaptor shank, said assembly comprising in combination;

an elongated tool adaptor shank having a gripping end and a driving end, with the outer surface of said shank being tapered towards said driving end and with said gripping end being defined by a cylindrical flange portion, said flange portion having a V-shaped channel formed therein and extending circumferentially therearound, said flange portion further including a pair of opposed slots interrupting said flange portion and in communication with said channel, said slots for engaging a machine tool;

a spindle having a cylindrical configuration with the outer surface thereof being threaded and with the inner surface of said spindle being tapered and substantially conforming to the configuration of said driving end of said tool shank such that said driving end is freely receivable therein;

an elongated cylindrical nut having front and rear ends, with the inner surface of said nut, adjacent to said rear end thereof, being threaded and adapted to engage the threaded portion of said spindle and with the inner surface of said nut adjacent to the front end thereof, including two opposed projections extending radially inwardly, whereby with said driving end of said tool adaptor shank being inserted within said tapered inner surface of said spindle, and said nut being mounted over said tool adaptor shank, with said projections being initially received in said slots, said nut may be rotated causing said threaded portions of said nut and spindle to be interlocked while said projections become engaged in said channel thereby positively drawing and securely locking said tool adaptor shank within said spindle; and wherein the distance between the front end and projections of said nut corresponds to the spacing between the center of said channel and the front surface of said gripping end of said shank so that said front end and front surface are coplanar when said projections are in said channel, to thereby facilitate the mounting of the cutting tools.

2. An assembly for mounting and ejecting cutting tools are recited in claim 1 wherein each said projection extends radially inwardly an amount substantially corresponding to the depth of said V-shaped channel in said tool adaptor shank.

3. An assembly for mounting and ejecting cutting tools as recited in claim 1 wherein the opposed sides of each said projection are chamfered and have a configuration complementary to the side walls of said V-shaped channel formed in said flange of said tool adaptor shank.

4. An assembly for mounting and ejecting cutting tools as recited in claim 1 wherein each said projection is defined by a cylindrical pin, said cylindrical pins being mounted in a pair of opposed cylindrical apertures formed in said nut.

5. An assembly for mounting and ejecting cutting tools as recited in claim 4 wherein a set of roller bearings are interposed between each said pin and the walls of the associated aperture in said nut.

6. An assembly for mounting and ejecting cutting tools as recited in claim 4 wherein each said pin is secured in the associated aperture of said nut by a lock screw.

7. An assembly for mounting and ejecting cutting tools as recited in claim 6 wherein said lock screw is threadably engaged with said nut and includes a head portion abutting the radially outer end of said cylindrical pin inhibiting the movement of said pin in a radially outward direction.

8. An assembly for mounting and ejecting cutting tools as recited in claim 1 wherein each said projection is defined by a longitudinally extending pin, each pin including a generally square base portion, each said base portion being mounted in a square aperture formed in said nut.

9. An assembly for mounting and ejecting cutting tools as recited in claim 8 wherein each said pin is secured in the associated aperture of said nut by a screw interlocked with said base portion.

10. An assembly for mounting and ejecting cutting tools as recited in claim 1 wherein said nut is dimensioned such that after it is mounted and tightened on said spindle, said front end thereof is coplanar with said flange portion of said shank.

* * * * *